(12) United States Patent
Haran et al.

(10) Patent No.: US 8,274,985 B2
(45) Date of Patent: Sep. 25, 2012

(54) CONTROL OF CELLULAR DATA ACCESS

(75) Inventors: Narayanan Haran, Hoffman Estates, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 1504 days.

(21) Appl. No.: 11/323,235

(22) Filed: Dec. 30, 2005

(65) Prior Publication Data

US 2007/0155384 A1 Jul. 5, 2007

(51) Int. Cl.
*H04L 12/56* (2006.01)
*H04M 1/66* (2006.01)
*H04W 4/00* (2009.01)
*G06F 15/173* (2006.01)
*G06F 15/16* (2006.01)

(52) U.S. Cl. .................. 370/395.54; 370/352; 370/353; 370/497; 370/310; 455/411; 455/432.3; 709/229; 709/224

(58) Field of Classification Search .................. 370/230, 370/395.42, 395.54, 475, 310–338, 352–356, 370/497, 389–392; 455/411, 432.3, 435.1–435.2; 709/224, 228–229; 379/142.12, 142.01–142.13
See application file for complete search history.

(56) References Cited

U.S. PATENT DOCUMENTS

| | | | | |
|---|---|---|---|---|
| 6,324,582 | B1* | 11/2001 | Sridhar et al. | 709/230 |
| 6,973,088 | B2* | 12/2005 | Kuzhiyil et al. | 370/395.2 |
| 7,184,418 | B1* | 2/2007 | Baba et al. | 370/331 |
| 7,437,772 | B1* | 10/2008 | Thenthiruperai et al. | 726/30 |
| 7,475,156 | B2* | 1/2009 | Kerr et al. | 709/238 |
| 7,483,411 | B2* | 1/2009 | Weinstein et al. | 370/338 |
| 7,570,663 | B2* | 8/2009 | Jungck | 370/498 |
| 2001/0052002 | A1* | 12/2001 | Lee et al. | 709/219 |
| 2002/0178238 | A1* | 11/2002 | Fletcher et al. | 709/220 |
| 2003/0208602 | A1* | 11/2003 | Bhalla et al. | 709/227 |
| 2004/0062254 | A1* | 4/2004 | Kuzhiyil et al. | 370/401 |
| 2004/0205243 | A1* | 10/2004 | Hurvig et al. | 709/245 |
| 2005/0044423 | A1* | 2/2005 | Mellmer et al. | 713/201 |
| 2005/0169249 | A1* | 8/2005 | Shirota et al. | 370/352 |
| 2006/0031385 | A1* | 2/2006 | Westerdal | 709/217 |
| 2006/0058021 | A1* | 3/2006 | Fox et al. | 455/422.1 |
| 2006/0123470 | A1* | 6/2006 | Chen | 726/5 |
| 2007/0091900 | A1* | 4/2007 | Asthana et al. | 370/395.42 |
| 2007/0283194 | A1* | 12/2007 | Villella et al. | 714/57 |
| 2012/0039325 | A1* | 2/2012 | Buckley et al. | 370/338 |

OTHER PUBLICATIONS

Strauss, Gary. "Cellphone technology rings in pornography in USA." USA Today, Tuesday, Dec. 13, 2005.

* cited by examiner

*Primary Examiner* — Ricky Ngo
*Assistant Examiner* — Wutchung Chu
(74) *Attorney, Agent, or Firm* — Leydig, Voit & Mayer, Ltd.

(57) ABSTRACT

The present invention provides methods and apparatus for controlling cellular access to data services from a mobile device such as a cellular telephone or PDA. The wireless network monitors IP traffic to and from the mobile device. Attempts to access an data service are checked to determine whether the requested access is authorized. Access to the data service is granted subject to the authorization. Access to the mobile device from external sources is also restricted.

20 Claims, 4 Drawing Sheets

CONTROL OF CELLULAR DATA ACCESS

FIELD OF THE INVENTION

The present invention relates generally to communication systems, and more particularly, to a system and method for controlling access to data services from a mobile telecommunication device.

BACKGROUND OF THE INVENTION

Many parents provide their children with cellular telephones for increased safety and peace of mind. Most cellular telephones include the ability to access data services. Such services may include using software such as a web browser, streaming media player, and the like to retrieve and render content from a server connected to the internet. While there are many benefits to being able to access data services from a mobile device, a child with an internet-capable cellular telephone would be able to browse the internet without parental supervision. This may enable the child to access content which the child's parent or guardian considers unsuitable or inappropriate. It would therefore be desirable to provide a means whereby a parent or guardian may control the content that a minor is able to access using the data capabilities of their cellular telephone.

Moreover, when a cellular device is connected to an IP network, it may be possible for content, such as pop-up advertisements and the like, to be pushed to the cellular device. This could also result in the exposure of a minor to unsuitable or inappropriate content. It would therefore also be desirable to provide a means for preventing access to a cellular device from an IP network.

SUMMARY OF THE INVENTION

It is, therefore, an object of the invention to provide a means whereby a parent or guardian may control the content that a minor is able to access using the data capabilities of their cellular telephone.

It is also an object of the invention to provide a means for preventing unauthorized access to a cellular device from an IP network.

These and other objects and advantages are provided by a system that controls access to the internet by controlling access to the Domain Name System (DNS). Specifically, content is requested by a user entering a Uniform Resource Locator (URL) on their mobile device. In resolving the URL into the IP address of the server, a system of the present invention checks a database to determine whether access to the URL is permitted. If access is permitted, the DNS is queried to resolve the server IP address; otherwise, the DNS lookup is blocked so that the content specified by the URL may not be accessed. Preferably, the system only permits access to internet content initially identified using a Uniform Resource Locator (URL).

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers and in which.

DETAILED DESCRIPTION

Figure 1:
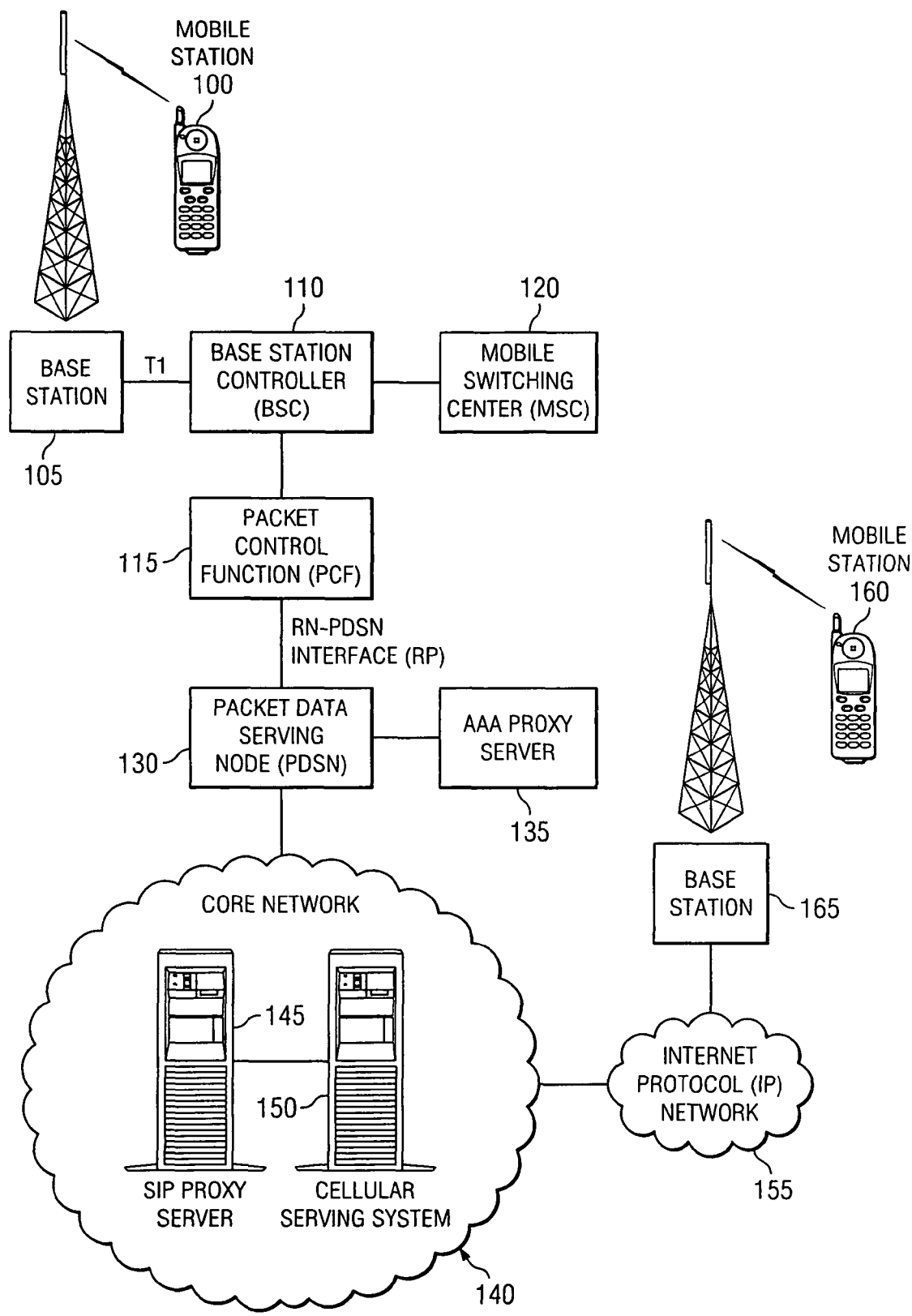
FIG. 1 is a schematic illustration of a cellular network in accordance with the present invention.

FIG. 1 schematically illustrates a representative environment of the present invention. Mobile Station (MS) 100, e.g., a cellular mobile telephone, wirelessly connects to base station 105 via a radio frequency (RF) network, e.g., a cdma2000 network. Base station 105 connects to base station controller (BSC) 110, typically via a wire-line, such as a T1 line. BSC 110 connects to and controls multiple base stations 105. BSC 110 connects to Packet Control Function (PCF) 115 and to Mobile Switching Center (MSC) 120.

PCF 115 connects to packet data serving node (PDSN) 130 via an RN-PDSN interface (RP). PDSN 130 connects to Authentication, Authorizing, and Accounting (AAA) proxy server 135 and to core network 140, both typically via wire-line. Core network 140 includes both Session Initiation Protocol (SIP) proxy server 145 and Cellular Serving System (CSS) 150, also typically connected via a wire-line. Core network 140 connects to communications network 155, e.g., the Internet.

The sequence of initiating and authorizing internet access is now described in connection with FIG. 2, in which vertical lines represent the objects listed in the boxes at the top of the line, and horizontal lines represent communication between the objects at either end of the line. The temporal sequence of events proceeds from top to bottom.

Figure 2:
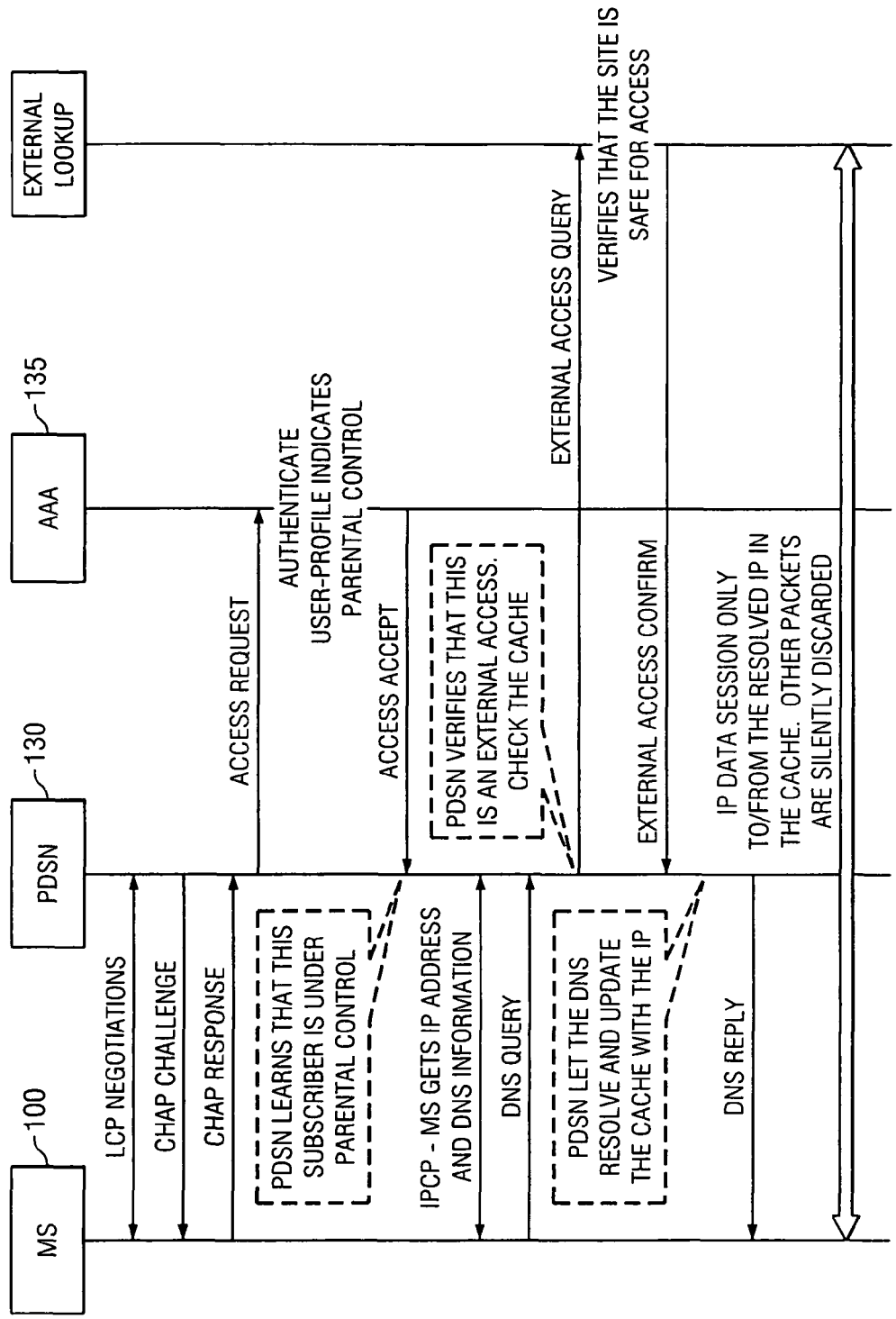
FIG. 2 is a call flow diagram showing successful access to an internet site.

As shown in FIG. 2, MS 100 negotiates a connection to PDSN 130 (via base station 105, BSC 110, and PCF 115) by using a suitable protocol, such as the Link Control Protocol (LCP). Upon establishment of the connection, PDSN 130 authenticates MS 100 using an authentication protocol such as the Challenge-Handshake Authentication Protocol (CHAP). For example, PDSN 130 sends a CHAP challenge to MS 100. MS 100 performs an operation on data contained in the challenge based on information known only to MS 100 and AAA proxy server 135. The results of the operation are then returned to PDSN 130 in the CHAP response. PDSN 130 forwards the CHAP response to AAA proxy server 135 for authentication. If the data in the CHAP response is correct, AAA proxy server sends PDSN 130 an indication that MS 100 has been authenticated. In addition, AAA proxy server 135 also returns data associated with MS 100, such as user profile data. The user profile data may indicate the optional services and features to which the user has subscribed. These optional service may include data access controls and/or restrictions.

To access data services, MS 100 requires an IP address. Although it is possible for MS 100 to have a permanently assigned IP address, IP addresses are typically dynamically assigned from a pool of available address. That is, after MS 100 has been authenticated it is assigned an IP address. When MS 100 disconnects from the network the IP address is returned to the pool of available addresses. PDSN 130 may use the IP Control Protocol (IPCP), or other suitable protocol, to provide MS 100 with an IP address.

MS 100 also needs the IP address of a server providing the desired data or services. Servers connected to the internet are identified by a numerical IP address. However, the numerical addresses are difficult for people to remember. To provide a more user-friendly naming scheme for internet connected servers, the Domain Name System (DNS) provides a mechanism for translating between a user-friendly text-based name and the computer-friendly IP address. The user-friendly names typically comprise a Uniform Resource Locator (URL) such as "http://www.somewebsite.com/somepicture.jpg" which identifies the content named "somepicture.jpg" at the server "www.somewebsite.com".

Typically, a user provides the URL of a web site or service to software executing on MS 100. For example, the user may enter a URL into an address field in a web browser. If the software does not know the IP address corresponding to the URL, the software sends a query to a DNS server to map the URL to an IP address of a server. If the IP address of the server is already known, a DNS query is not necessary. The IP address of a DNS server able to map URLs to IP addresses, as well as any other information needed to access the internet or other data services, may also be provided to MS 100 using the IPCP. Typically, a cellular provider may provide its own caching DNS server.

Once the IP address of the server specified in a URL is known, the MS 100 hosted software sends a request to the server to retrieve the identified content according to an established communication protocol. For example, a web browser may send an HyperText Transport Protocol (HTTP) request to the server. Typically, the HTTP request includes the URL entered by the user. The server may then use the URL to determine what data to send back to the web browser, which data is then displayed, or otherwise rendered for the user.

In accordance with the principles of the present invention, communication between MS 100 and the internet is monitored by PDSN 130 so that access can be controlled. A first mechanism by which PDSN controls access to data services is by controlling access to the DNS so that only URLs for authorized content and/or servers are resolved to an IP address. As shown in FIG. 2, the DNS query from MS 100 is sent to PDSN 130. Before forwarding the DNS query to a DNS server, PDSN 130 first determines whether access to the URL in the DNS query is permitted. For example, user profile data returned from AAA server 135 may include a list or permitted and/or restricted URLs. This list may then be used to determine whether access to a user entered URL is permitted.

Alternatively, PDSN 130 may query a database of permitted and restricted URLs to determine whether access to a specific user-entered URL is to be permitted. The database may be provided by the cellular data service provider or by a third party provider. Various methods may be used to determine if access should be permitted. For example, the database may simply keep a list of permitted URLs for each subscriber, such that access is permitted only if a URL is in the database. Conversely, the list may instead contain restricted URLs so that access is denied if a user-entered URL is in the database. Maintenance of such lists it likely to be difficult and error prone.

Another alternative is for PDSN 130 to query a content rating service and to then permit or deny access based on the content rating. The content rating information may be a government mandated system, a voluntary industry system, or a third party rating system, including private or public rating entities. For example, web sites may be assigned content ratings similar to the MPAA rating system used for movies or the ERB rating system used for electronic games. User profile data may then indicate which content ratings are permissible. For example, based on the user profile data PDSN may only permit access to the equivalent of 'G'-rated content for a suggested minimum age of a person.

If access to a user-specified URL is permitted, PDSN 130 then issues a DNS query to determine the IP address of the server corresponding to the URL. The results of the DNS query are then returned to MS 100. The DNS results are then used by MS 100 to access the requested services at the resolved IP address. In addition, the access and/or DNS query results are cached by PDSN 130 for the duration of a data session. Data may then be sent to/received from resolve IP addresses in the session cache. Other data packets are silently discarded.

Figure 3:
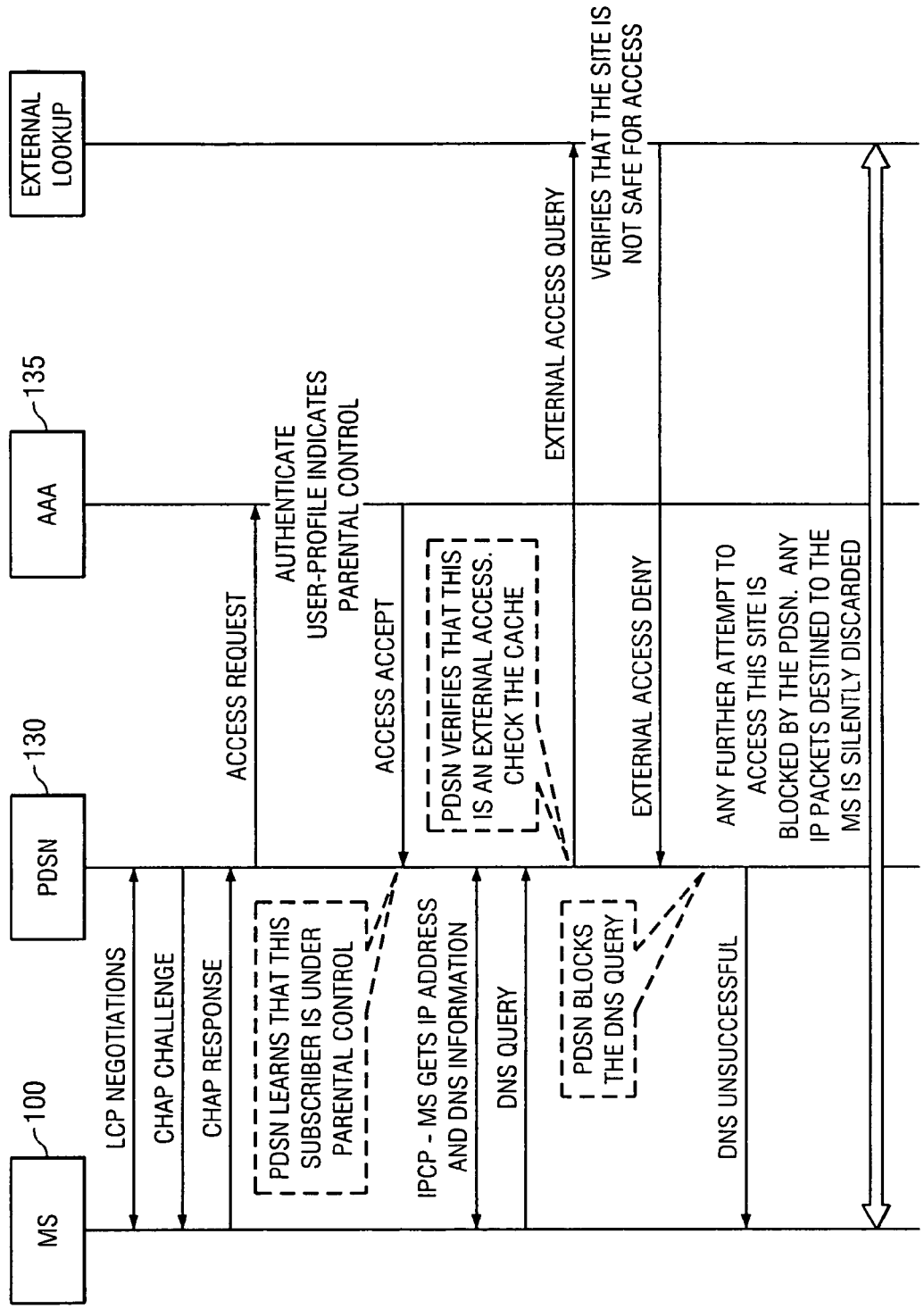
FIG. 3 is a call flow diagram showing a blocked attempt to access an internet site.

If access to a user-specified URL is restricted, then the DNS lookup is not performed and a DNS lookup failure may be reported to MS 100, as shown in FIG. 3. Alternatively, the DNS lookup query from MS 100 may be allowed to time out. A further alternative is to redirect the web browser on MS 100 to a web page indicating that the requested URL is restricted.

The above-described mechanism control access to data services by controlling access to the DNS. A second mechanism by which PDSN 130 controls access to data services is by filtering data packets based on the IP addresses contained in the data packets. For example, if MS 100 already knows the resolved IP address for a server, MS 100 will not issue a DNS query. Instead, MS 100 will communicate directly with the server at the resolved IP address. Accordingly, PDSN 130 monitors the IP addresses of data packets to and from MS 100. Specifically, the destination IP address of data packets being sent by MS 100 are checked against IP addresses cached by PDSN 130 to determine if access to the IP address is permitted or denied. If access is permitted, then the packet is forwarded to the destination IP address. If access is not permitted, the data packet is discarded silently. Optionally, the fact that a packet has been discarded may be logged or communicated to the user.

Analogously, the source IP address of data packets sent to MS 100 are checked to see if access to the server is authorized. If the data packet is part of communications initiated by MS 100, then PDSN 130 will have the senders IP address in the cache and, therefore, know whether access is permitted. If the communication was not initiated by MS 100, PDSN 130 may not have a record of the IP address in the cache. PDSN 130 may, therefore, drop packets for which the sender IP addresses is not in the cache. Alternatively, PDSN 130 may use a reverse-DNS query to determine the name of the server and then submit the name to AAA server 135 to determine whether access is to be permitted. If access to the sender is permitted the received packets are forwarded to MS 100; otherwise, the packets are dropped silently. Optionally, the fact that a packet has been discarded may be logged or communicated to the user.

Optionally, the system of the present invention may log information about attempted URL accesses. For example, each URL could be logged with the time and date of the attempt and an indication of whether the access was permitted or denied. The log information may be used, for example, to monitor data accesses of a minor using a cellular device.

In the system described above, the DNS query is performed after the access query. However, the DNS query and access queries may also be performed in parallel. The resolved IP address would only be returned to MS 100 if access to the URL is permitted. Performing the operations in parallel rather than sequentially may reduce latency for the first request to any particular URL during a data session.

Figure 4:
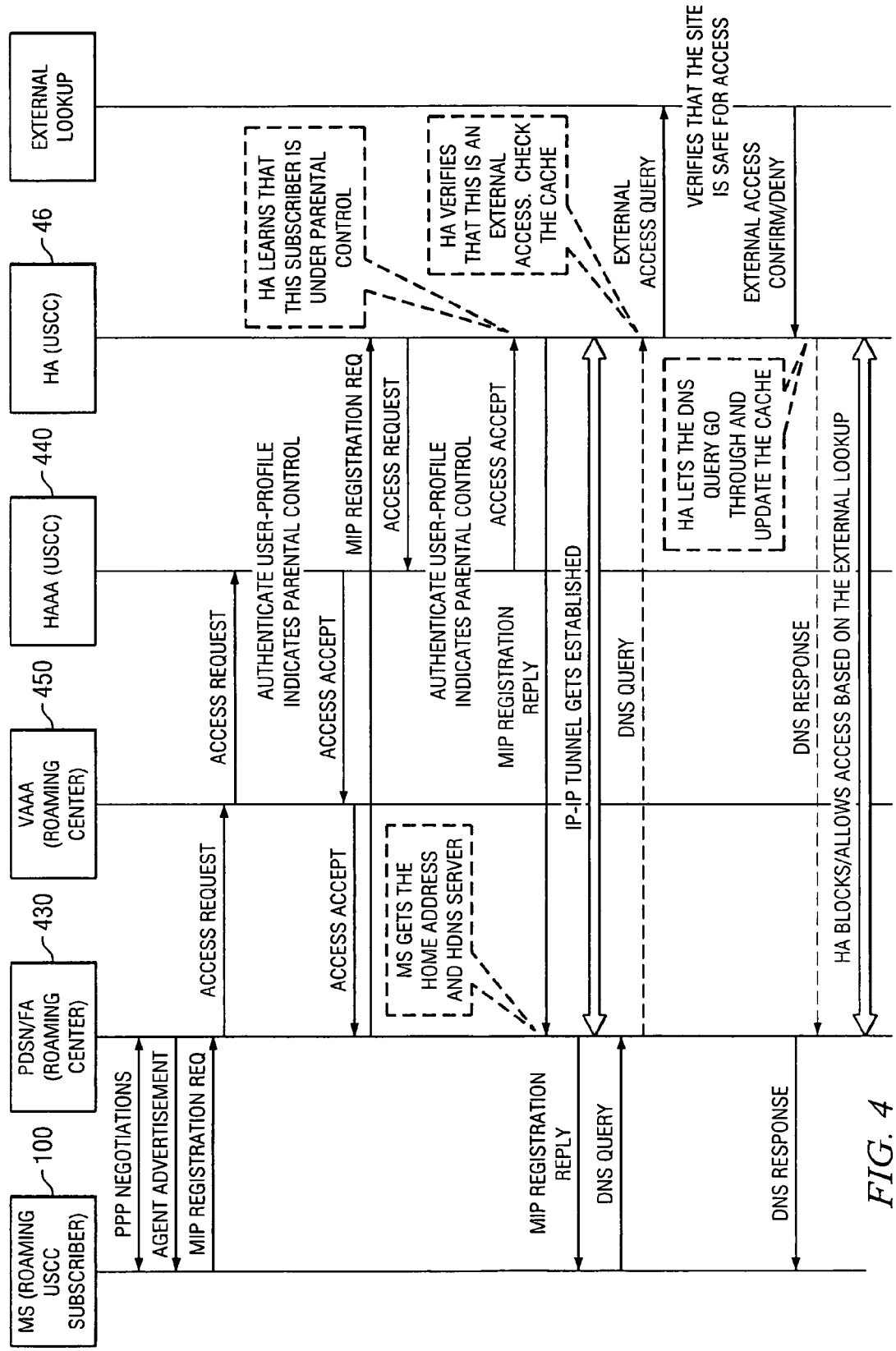
FIG. 4 is a call flow diagram showing an attempt to access an internet site while roaming.

FIGS. 2 and 3 show the communication sequence when MS 100 is operating within its own cellular network. FIG. 4, in contrast, shows the communication sequence when data access is attempted while MS 100 is operating within a foreign cellular network, i.e., while roaming. First MS 100 establishes a PPP connection with the PDSN/foreign agent (PDSN/FA) 430 of the roaming carrier. When a connection is established, PDSN/FA 430 advertises the services it is able to provide. For example, PDSN/FA 430 may advertise that roaming data access is available.

To begin data access while roaming, MS 100 issues a Mobile IP (MIP) request in order to obtain an IP address. In response to the MIP request, MS 100 is authenticated by Home AAA (HAAA) server 440 via Visitor AAA (VAAA) server 450. If MS 100 is authenticated, the MIP request is forwarded to the users Home Agent (HA) 460. HA re-authenticates MS 100. If MS 100 authenticates successfully, HA 460 issues an IP address to MS 100 via an MIP registration reply. An tunnel is then established between MS 100 and HA 460 and subsequent data communications are passed between MS 100 and HA over the tunnel. A tunnel essentially provides a secure communication channel between the endpoints of the tunnel, and may be, for example and IP-IP tunnel or a GRE tunnel. In this case, the tunnel provides a communication channel between MS 100 and HA 460. Access to digital services is then controlled in a manner analogous to that described above with regards to FIGS. 2 and 3 except that HA 460 serves the role of PDSN 130.

In describing the invention, various preferred embodiments of the present invention are disclosed herein. However, one of skill in the art will understand that the disclosed embodiments are provided only for purposes of illustration and that various alterations, enhancements, or modifications may be made without departing from the spirit of the invention. For example, other protocols may be substituted for those specified in the illustrative embodiment. Therefore, the present invention is only limited by the scope of the claims appended hereto.

What is claimed is:

1. A method for a Packet Data Serving Node (PDSN) to control data access for a mobile station, the method comprising:
   receiving by the PDSN, from the mobile station, a request to provide a network address of a source of data services that is connected to an Internet and identified in the request by a name;
   conditionally permitting access, by the mobile station to the source of data services, by way of controlling access to a Domain Name System (DNS) for resolving the name to the network address of the source of data services, the conditionally permitting being based on comparing the name to a list of Uniform Resource Locators (URLs); and
   filtering, at the PDSN, data packets communicated between the mobile station and networked data services, via the PDSN, based on an IP address contained in the data packets for the networked data services, and
   wherein during filtering, if a communication including a received data packet from a networked sender was not initiated by the mobile station, then the PDSN uses a reverse-DNS query based on the IP address for the networked sender contained in the received data packet to determine the name corresponding to the networked sender, and thereafter using the name to determine whether to drop the received data packet.

2. The method of claim 1, wherein the request to provide a network address is a query of the Domain Name System (DNS) to resolve the name to the network address.

3. The method of claim 2 wherein the name of the source of data services is obtained from a Uniform Resource Locator.

4. The method of claim 1 further comprising caching a result provided by the DNS for the name, the result including a resolved network address.

5. The method of claim 1 wherein the comparing is performed in parallel with resolving the name to a network address.

6. The method of claim 1 wherein conditionally permitting access comprises querying a database to determine if access to the named source of data services is permitted.

7. The method of claim 6, wherein the database is provided by a third party.

8. The method of claim 6 wherein conditionally permitting access comprises determining access based on an indicia associated with the named source of data services.

9. The method of claim 8 wherein the indicia indicates the type of content available from the source of data services.

10. The method of claim 8, wherein the indicia is provided by one or more of the group consisting of: a governmental entity, a public entity, and a private entity.

11. The method of claim 10, wherein the indicia indicates a suggested minimum age of a person accessing the content.

12. The method of claim 10, wherein the indicia indicates categories of content available from the server.

13. The method of claim 1, further comprising establishing a communication channel to the mobile station, wherein the request is received over the communication channel.

14. The method of claim 13, wherein the channel is an IP-IP tunnel.

15. The method of claim 14, wherein the IP-IP tunnel provides the communication channel between a roaming mobile station and a home agent associated with the mobile station.

16. A networked system including a Packet Data Serving Node (PDSN) to control data access for a mobile station, the PDSN comprising:
   a first access control mechanism configured to enable the PDSN to perform the steps of:
      receiving by the PDSN, from the mobile station, a request to provide a network address of a source of data services that is connected to an Internet and identified in the request by a name;
      conditionally permitting access, by the mobile station to the source of data services, by way of controlling access to a Domain Name System (DNS) for resolving the name to the network address of the source of data services, the conditionally permitting being based on comparing the name to a list of Uniform Resource Locators (URLs); and
   a second access control mechanism configured to enable the PDSN to perform the steps of:
      filtering, at the PDSN, data packets communicated between the mobile station and networked data services, via the PDSN, based on an IP address contained in the data packets for the networked data services, and
      wherein during filtering, if a communication including a received data packet from a networked sender was not initiated by the mobile station, then the PDSN uses a reverse-DNS query based on the IP address for the networked sender contained in the received data packet to determine the name corresponding to the networked sender, and thereafter using the name to determine whether to drop the received data packet.

17. The system of claim 16, wherein the request to provide a network address is a query of the Domain Name System (DNS) to resolve the name to the network address.

18. The system of claim 16 wherein the PDSN further comprises a storage for caching a result provided by the DNS for the name, the result including a resolved network address.

19. The system of claim 16 wherein the PDSN is configured to perform the comparing in parallel with resolving the name to a network address.

20. The system of claim 16 wherein the system is configured such that during the conditionally permitting access step the PDSN queries a database to determine if access to the named source of data services is permitted.

* * * * *